United States Patent
Diener et al.

(10) Patent No.: US 11,913,850 B2
(45) Date of Patent: Feb. 27, 2024

(54) FLOW-THROUGH PRESSURE TRANSDUCER

(71) Applicant: WIKA Alexander Wiegand SE & Co. KG, Klingenberg (DE)

(72) Inventors: Markus Diener, Elsenfeld (DE); Lukas Spieler, Mespelbrunn (DE); Rolf Bloecher, Miltenberg (DE); Thomas Rothenbach, Buergstadt (DE)

(73) Assignee: WIKA Alexander Wiegand SE & Co. KG, Klingenberg/Main (DE)

( * ) Notice: Subject to any disclaimer, the term of this patent is extended or adjusted under 35 U.S.C. 154(b) by 174 days.

(21) Appl. No.: 17/473,654

(22) Filed: Sep. 13, 2021

(65) Prior Publication Data

US 2021/0404898 A1 Dec. 30, 2021

Related U.S. Application Data

(63) Continuation of application No. PCT/EP2020/056661, filed on Mar. 12, 2020.

(30) Foreign Application Priority Data

Mar. 13, 2019 (DE) ...................... 10 2019 106 342.6

(51) Int. Cl.
- *G01L 9/00* (2006.01)
- *G01L 19/00* (2006.01)
- *G01L 19/14* (2006.01)

(52) U.S. Cl.
CPC .......... *G01L 9/0032* (2013.01); *G01L 9/0027* (2013.01); *G01L 19/0038* (2013.01); (Continued)

(58) Field of Classification Search
None
See application file for complete search history.

(56) References Cited

U.S. PATENT DOCUMENTS

| | | |
|---|---|---|
| 3,046,788 A | 7/1962 | Laimins |
| 4,207,551 A | 6/1980 | Kautzky |

(Continued)

FOREIGN PATENT DOCUMENTS

| | | |
|---|---|---|
| DE | 102016015447 A1 | 3/2017 |
| EP | 0074574 A1 | 3/1983 |

(Continued)

OTHER PUBLICATIONS

International Search Report dated Jul. 14, 2020 in corresponding application PCT/EP2020/056661.

*Primary Examiner* — Brandi N Hopkins
*Assistant Examiner* — Nigel H Plumb
(74) *Attorney, Agent, or Firm* — Muncy, Geissler, Olds & Lowe, P.C.

(57) ABSTRACT

A measuring system for a physical variable, the measuring system having a housing, a measuring tube having at least one tubular deformation body having a cross-section which is deformed at least partially and which is configured to expand elastically under pressure, two feed sections attached to end sections of the deformation body, two sealing sections for sealingly coupling the measuring system to a process, and two molded support sections to carry the housing. A measuring sensor system measures values of at least one of a stretching or a widening at at least two points on a section of the deformation body. An evaluation unit evaluates measured values of the stretching and widening and outputs them as a measurement signal. The housing at least partially surrounds and stabilizes the measuring tube on an outside and is provided with a vacuum and/or a negative pressure compared to the outside atmosphere.

23 Claims, 7 Drawing Sheets

(52) U.S. Cl.
    CPC ...... *G01L 19/0061* (2013.01); *G01L 19/0092* (2013.01); *G01L 19/14* (2013.01)

(56) References Cited

U.S. PATENT DOCUMENTS

| | | | | |
|---|---|---|---|---|
| 6,171,253 | B1 * | 1/2001 | Bullister | A61M 60/216 |
| | | | | 73/730 |
| 6,367,333 | B1 * | 4/2002 | Bullister | A61B 5/6884 |
| | | | | 73/715 |
| 6,957,588 | B1 * | 10/2005 | Kicher | G01L 9/0027 |
| | | | | 73/726 |
| 10,794,787 | B2 | 10/2020 | Zipp et al. | |
| 2018/0180505 | A1 * | 6/2018 | Zipp | G01L 7/043 |

FOREIGN PATENT DOCUMENTS

| | | | |
|---|---|---|---|
| WO | WO0065984 | A1 | 11/2000 |
| WO | WO0101099 | A1 | 1/2001 |

\* cited by examiner

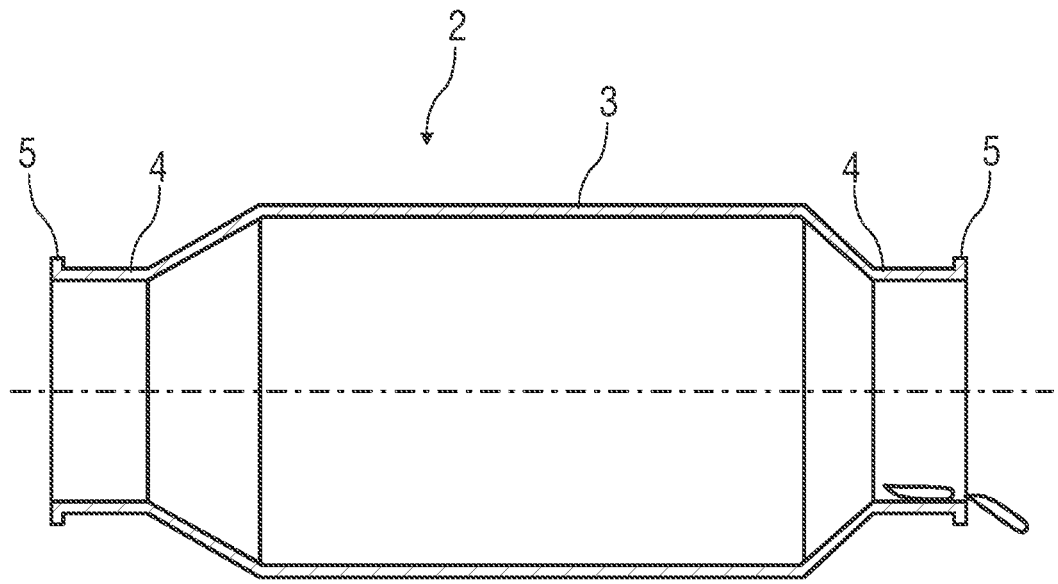
FIG 2A
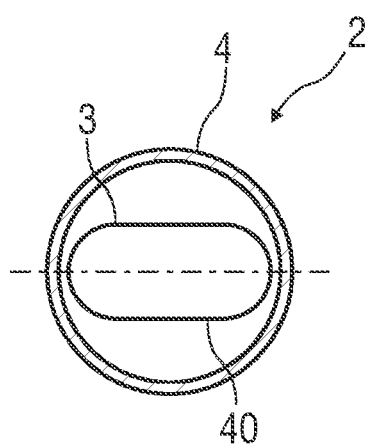 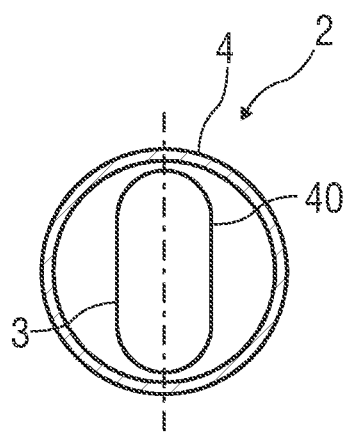
FIG 2B  FIG 2C

FLOW-THROUGH PRESSURE TRANSDUCER

This nonprovisional application is a continuation of International Application No. PCT/EP2020/056661, which was filed on 12 Mar. 2020, and which claims priority to German Patent Application No. 10 2019 106 342.6, which was filed in Germany on 13 Mar. 2019, and which are both herein incorporated by reference.

BACKGROUND OF THE INVENTION

Field of the Invention

The present invention relates to a measuring system for a physical variable, in particular pressure.

Description of the Background Art

Measuring systems for a physical variable, in particular pressure, are generally known in the art, e.g. in U.S. Pat. Nos. 4,207,551 A, 3,046,788 A and EP 0 074 574 A1. Such measuring systems comprise a tubular deformation body which has circular cross-sections at its ends for sealing connection to a process. The tubular deformation body also has a measuring section or deformation body deviating from the circular form, e.g. oval, elliptical, flat-oval or non axially-symmetric, such as "D-shaped". By changing a process pressure relative to a pipe external pressure, an elastic change in the geometry of the tubular deformation body is brought about. If an internal pressure is greater than the pipe external pressure, a deformed pipe cross-section tends to assume the circular shape and in the process generates various types of expansion and compression, which also act on the outer surface of the pipe. If the internal pressure is lower than the pipe external pressure, the pipe cross-section increasingly tends to assume a geometry that deviates from the circular shape, that is, the extent of the deformation is increased. This can be referred to as a "compression" of the pipe cross-section. This also leads to various expansions and compressions, which also act on the outer surface of the pipe. In the following, a widening of the pipe section is also referred to as a compression, depending on whether there is overpressure or underpressure relative to the pipe external pressure in the measuring tube. When using a sufficiently strong, spring-elastic material, this effect shall be used as a measuring effect for the variable pressure.

SUMMARY OF THE INVENTION

It is therefore an object of the present invention to provide a measuring system for a physical variable that is improved over the prior art.

A measuring system according to an exemplary embodiment of the invention for a physical variable, in particular pressure, comprises a housing and a measuring tube. The measuring tube comprises at least one tubular deformation body, the cross-section of which is at least partially deformed in a defined manner deviating from a circular cross-section and which expands elastically under pressure. Furthermore, the measuring tube comprises two feed sections, which are each attached to end sections of the deformation body and each have a circular cross-section at their outer edge sections, and two sealing sections for sealingly coupling a measuring system to a process, the sealing sections formed to the outer edge sections of the feed sections. Furthermore, the measuring tube comprises two molded-on support sections that carry the housing, a measuring sensor system which measures values of an expansion and/or widening at at least two points on a section of the deformation body, and an evaluation unit which electronically evaluates measured values of the expansion and/or widening and outputs them as a measurement signal. The housing at least partially encloses the measuring tube on the outside in its direction of extension and stabilizes it against mechanical influences and other influences.

The measuring system is a cost-efficient solution for a tubular measuring system for the primary measured variable, pressure. Further measured variables, such as a temperature and a flow rate and measured variables derived therefrom, such as a density may also be integrated. The measuring system has a structure with a free cross section to be flown through. Besides, the construction is free of dead space, i.e. there is no possibility for a medium flowing through the measuring system to get caught in dead ends or undercuts or to form deposits there. The measuring system enables external pressure fluctuations, temperature effects, environmental influences and mechanical repercussions to be sufficiently compensated for or prevented. Particularly high measuring accuracies can be achieved in this way.

The housing can enclose the measuring tube in a sealing manner. Thus, the housing may be subjected to a negative pressure or a vacuum.

The inside of the measuring tube can be lined with silicone or an exchangeable silicone cover piece, so that a flow resistance for the medium flowing through is minimized and/or, due to the exchangeability, the requirements for increased hygiene are covered due to a possibility of single use.

The deformation body of the measuring tube can have a wall thickness of 0.1 mm to 0.5 mm or 0.2 mm to 3.0 mm.

Connection pieces of the measuring tube have an inside diameter of 3 mm to 40 mm or 20 mm to 60 mm.

The feed sections can have a wall thickness which corresponds to a wall thickness of the deformation body. Thus, there are no steps between the feed sections and the deformation body, which in turn results in a low flow resistance and free cross section for the medium flowing through.

The feed sections can be solid and/or have a transition of the inner contour from circular to oval. In particular, the massive feed sections are distinguished from the deformation body by a particularly low deformability. The massive design of the feed sections avoids deformation of the same and a resulting corruption of measured values. For example, the solid feed sections are produced by machining, such as drilling and/or milling, of a body formed from a solid material, in particular a metal or a metal alloy. In the alternative, the production can be done by reshaping solid material.

The feed sections can be made as one piece with the support sections and the sealing sections. This also results in a low flow resistance and free cross-section for the medium flowing through.

The housing can be joined to the support sections by a material-bond and in a sealing manner. Thus, the housing can be subjected to a negative pressure or a vacuum.

The housing can be provided with a vacuum or with a negative pressure in relation to the outside atmosphere.

The housing can have a service port for installing or checking the vacuum or negative pressure in order to advantageously facilitate the installation of the vacuum or negative pressure.

The housing can have a pressure sensor or vacuum sensor inside for monitoring the vacuum or the negative pressure in order to facilitate monitoring of the vacuum or the negative pressure in an advantageous manner.

The measuring tube can have an applied temperature sensor that is positioned inside the housing or on the measuring tube. In this way, a temperature of the medium can also be recorded and, if necessary, processed.

The housing can have a glass bushing toward the outside atmosphere or toward a second part of the housing, wherein contacts for signal transmission are passed through the glass bushing. This enables a reliable signal transmission for output, storage and/or further processing of the recorded data.

Further, the measuring system can comprise an interface that can be contacted via a plug contact and/or a display for outputting measured values in order to advantageously enable the recorded data to be displayed.

The evaluation unit can be designed to evaluate stretchings and/or widenings of the deformation body of the measuring tube, in particular with the aid of a Fast Fourier Transformation, based on data recorded by means of an optical measuring system, data captured by means of laser optics, the laser optics carrying out a reference measurement on the basis of laser radiation guided via mirrors and/or carrying out a direct measurement based on laser radiation guided via a beam splitter or a common passage via at least three mirrors, data recorded by means of at least one capacitive sensor, data captured by means of at least one strain-sensitive optical fiber sensor which is wound around the measuring tube, data recorded by means of two or four strain gauges, data recorded by means of a Wheatstone bridge, which is formed from strain gauges, and/or data recorded by means of at least one surface acoustic wave sensor. Such an evaluation is very reliable.

The measuring system can further comprise sensors for determining a flow rate and at least one output unit for outputting a signal comprising the flow rate, a pressure and a temperature.

The housing can have a length of 100 mm to 300 mm or 50 mm to 800 mm.

The measuring tube and the feed sections can be joined by means of weld seams, the weld seams being produced by welding, through welding, orbital welding and/or laser welding. The weld seams may be produced relatively easily and enable a fluid-tight and particularly durable joining of the measuring tube and the feed sections as well as a low roughness of an inner surface of the measuring tube and the feed sections in the area of the weld seams. This makes the measuring system particularly suitable for applications in the pharmaceutical sector as well as in the food industry.

The roughness of the inner surface of the measuring tube and the feed sections in the area of the weld seams can have an Ra value of less than or equal to 3 μm, in particular of less than or equal to 2 μm, in particular of less than or equal to 0.8 μm. This results in a low flow resistance and free cross-section for the medium flowing through. This also allows to meet requirements for increased purity of process media.

A transition between an inner surface of the measuring tube and the feed sections in the area of the weld seams can run at least substantially flat and/or without edges, steps and/or without ejections with a maximum height of 2 mm. This also results in a low flow resistance and free cross-section for the medium flowing through.

The measuring section or the deformation body and/or the feed sections can have a larger diameter and/or cross section than the sealing sections.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 2A to 2K schematically show different cross sections of a tubular deformation body of a measuring tube, FIG. 3 schematically shows a perspective view of a measuring tube, FIGS. 4A and 4B schematically show different representations of a measuring tube, and FIG. 5 schematically shows a sectional illustration of a measuring tube, including an optical evaluation.

DETAILED DESCRIPTION

Figure 1:
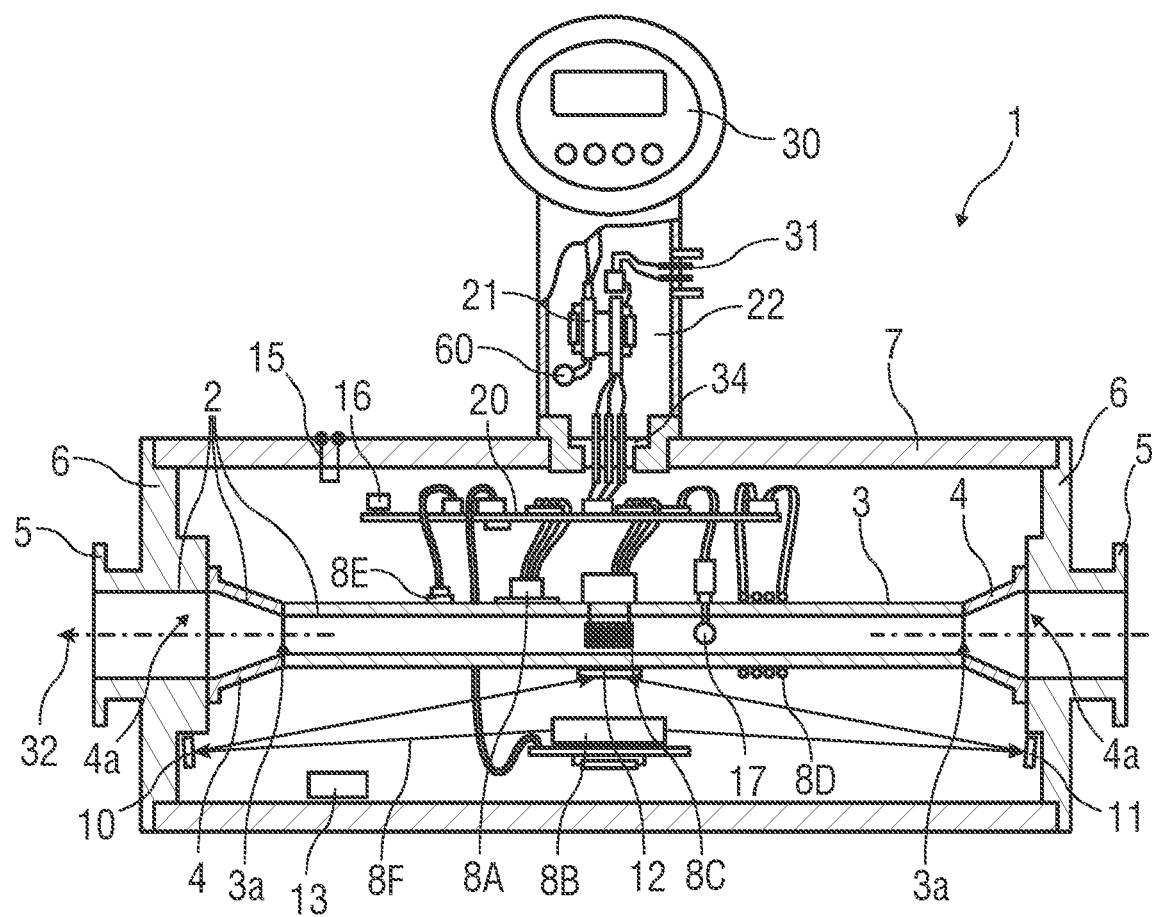
FIG. 1 schematically shows a measuring system for a physical quantity.

In FIG. 1, a possible exemplary embodiment of a measuring system 1 for a physical variable is shown schematically.

The measuring system 1 comprises a measuring tube 2.

The measuring tube 2 in turn comprises a deformation body 3, which is at least in part defined deviating from a circular cross-section, flattened or deformed and can expand elastically under pressure.

Furthermore, the measuring tube 2 comprises two feed sections 4, which are each attached to end sections 3a of the deformation body 3 and, toward the outside at their outer edge portions 4a, have a circular cross-section. At their ends, the feed sections 4 have sealing sections 5 integrally formed toward the outside, which are provided for a sealing coupling of the measuring system 1 to a process.

Support sections 6, which carry an outer housing 7 of the measuring system 1, are molded to the feed sections 4 and/or sealing sections 5.

A measurement technology or measurement sensor system 8, which measures values of a strain and/or widening AW at a section of the deformation body 3, is implemented with capacitive sensors 8A and/or laser optics 8B and/or strain-sensitive sensors or strain gauges 8C.

The laser optics 8B direct at least one laser beam 8F onto the mirrors 10, 11, which are aligned for a reference measurement. At the mirrors 10, 11, the respective laser beam 8F is directed onto a mirror 12 arranged on the deformation body 3, which mirror has different positions relative to the mirrors 10, 11 and the laser optics 8B depending on the widening AW. By means of a detector, not shown in detail, which is arranged, for example, in the area of at least one of the mirrors 10, 11 or in the area of the laser optics 8B, a corresponding impact position of the laser radiation reflected by the mirror 12 can be determined depending on a position of the mirror 12, and based on this, a value of the widening AW can be derived. In the alternative, the mirror 12 itself is designed as a detector, for example as a CCD chip.

Furthermore, a fiber sensor 8D can detect strains. Optionally, a so-called fiber Bragg technique can be used to measure a temperature in addition to the expansion. For this purpose, a fiber of the fiber sensor 8D is for example wound around a relevant pipe section of the measuring tube 2 and optionally fixed with elastic potting.

In the alternative, an expansion and/or widening AW is measured by means of strain gauges 8C, which are applied to the deformation body 3 and which are also referred to as strain measuring resistors. For this purpose, strain gauges 8C glued to the deformation body 3 or other suitable strain measuring elements that are applied to the deformation body 3 by another suitable method are in particular possible.

Furthermore, so-called surface acoustic wave sensors 8E, or in short SAW sensors, can sense expansion and a flow inside the measuring tube 2.

For this purpose, the housing 7 is optionally evacuated or provided with a vacuum via a connection 15 which is welded to form a seal or is provided as a coupling for service purposes. In order to maintain the vacuum inside the housing 7 for as long as possible, a getter material 13 arranged to absorb moisture is arranged inside of the housing 7 in a possible embodiment.

In one possible embodiment, the vacuum inside the housing 7 is monitored by a vacuum sensor 16.

An attached temperature sensor 17 detects a temperature on the measuring tube 2 to compensate for temperature errors.

This is offset with the measured values in an evaluation unit, in particular an evaluation electronics on a circuit board 20 in the housing 7 or on a circuit board 21 in a second housing part 22. There, the recorded measured values are evaluated, converted and output as a measuring signal via a display and/or radio device 30 or a connector interface 31. For this purpose, a relative pressure sensor for detecting an external pressure relative to the negative pressure in the housing 7, or a barometric ambient pressure sensor 60 for detecting the external pressure can also be used for outputting a relative pressure signal.

The housing 7 at least partially encloses the measuring tube 2 on the outside in its direction of extension 32, in the alternative of course in a completely sealing manner, by welding on the support sections 6. It encompasses the measuring tube 2 and stabilizes it against mechanical influences and other influences.

The housing 7 and the housing part 22 are separated by a sealing glass bushing 34, which leads the measurement signals to the outside and/or leads a current and power supply inside. As an alternative to the glass bushing 34, signals and energy may also be transmitted by radio, e.g. via RFID or via induction. The housing part 22 may also be completely encapsulated and the circuit boards 20, 21 are provided with cutouts for this purpose, so that the potting compound well distributes and well encloses all components. Alternatively, the circuit boards 20, 21 and conductor tracks are also partially flexible in the form of flexible circuit boards (flexible printed circuit, or FPC in short).

In a possible further embodiment of the measuring system 1, the measuring section or the deformation body 3 comprises one or more temperature sensors 17 and at least one heating element, so that a flow direction of a medium and/or a flow speed of the same may be determined by evaluating a temperature measurement.

FIGS. 2A to 2F and 2H to 2K show cross sections of the tubular deformation body 3 and thus different measuring cross-sections of the measuring tube 2, such as a flat oval 40 or an ellipse 41, as well as arrangements of sensors, in particular capacitive sensors 8A, surface acoustic wave sensors 8E and/or strain gauges 8C.

Figure 2D:
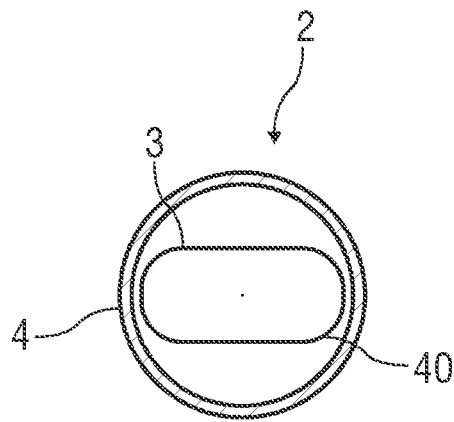
Figure 2E:
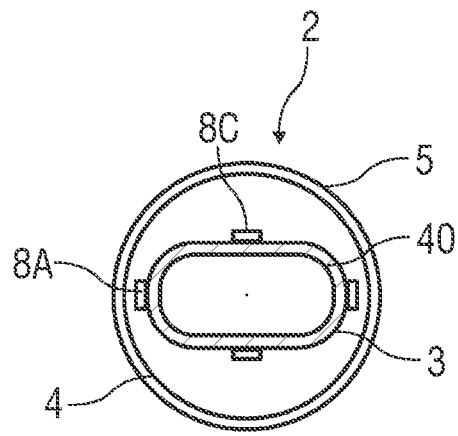
Figure 2F:
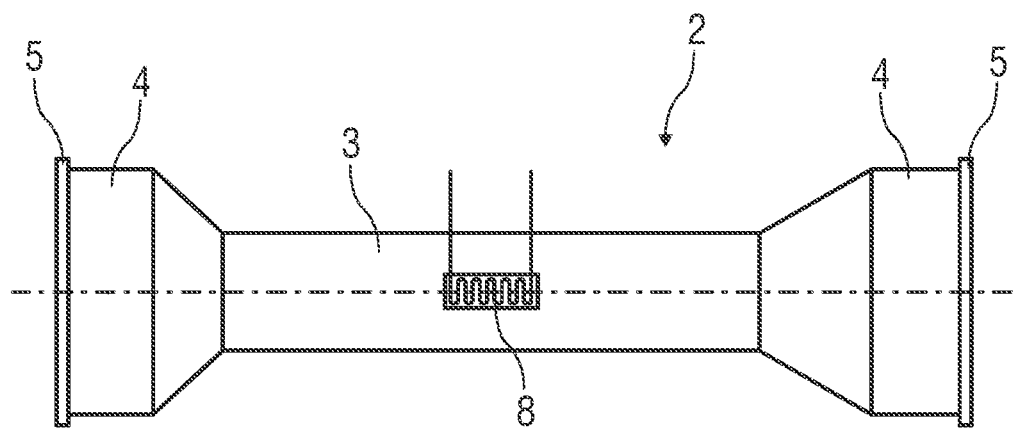
Figure 2H:
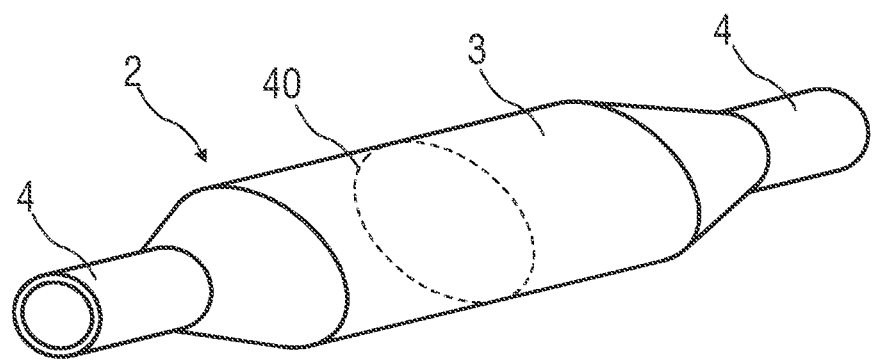
Figure 2I:
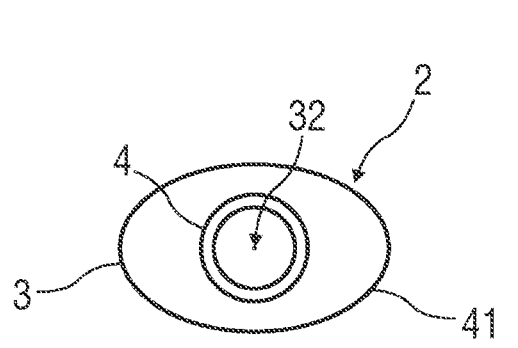
Figure 2J:
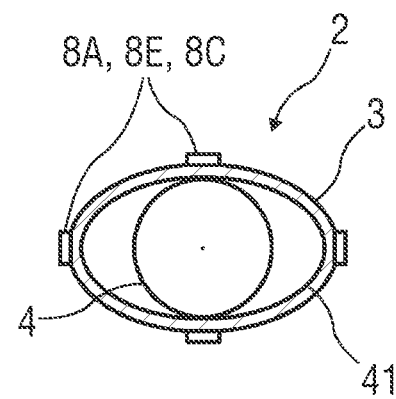
Figure 2K:
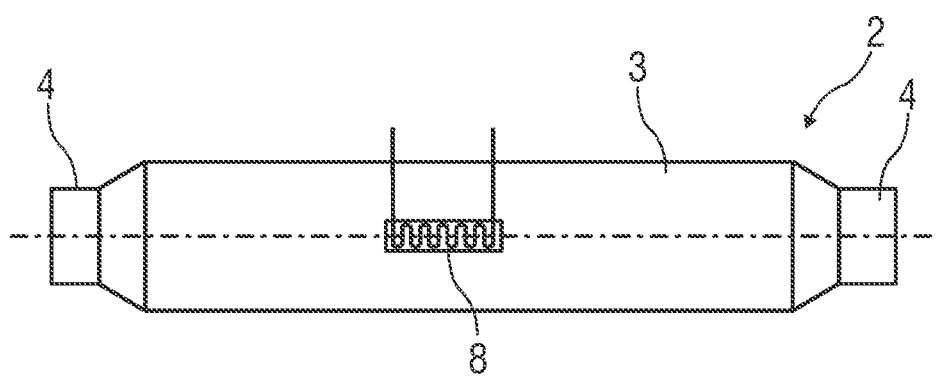

In particular, the measuring tube 2 may be aligned in such a way that it can run empty when a system is emptied (see FIG. 2C or FIG. 2J). A slight incline may be advantageous here.

The exemplary embodiments shown in FIGS. 2H to 2K are produced, for example, by expansion in so-called hydroforming processes by means of internal pressure. It is particularly advantageous if the measuring section or deformation body 3 always has a larger diameter or cross section than the sealing section 5.

Figure 3:
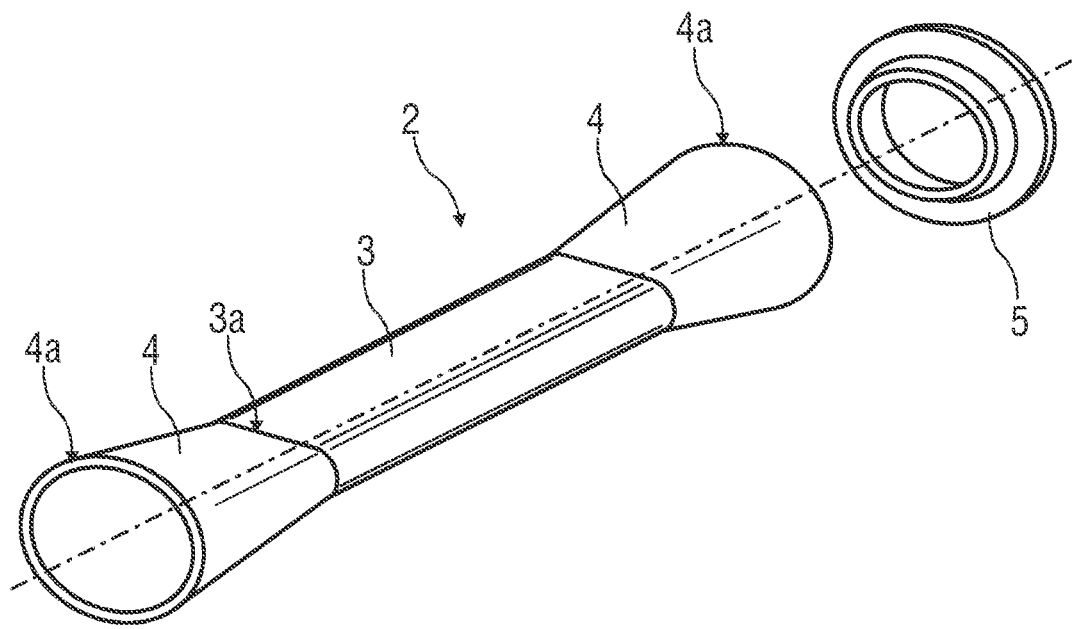

FIG. 3 shows a perspective view of a possible embodiment of a measuring tube 2 with a deformation body 3 and two feed sections 4 which connect the circular shape to the deformation body 3. Sealing sections 5 may optionally be welded on.

Figure 4A:
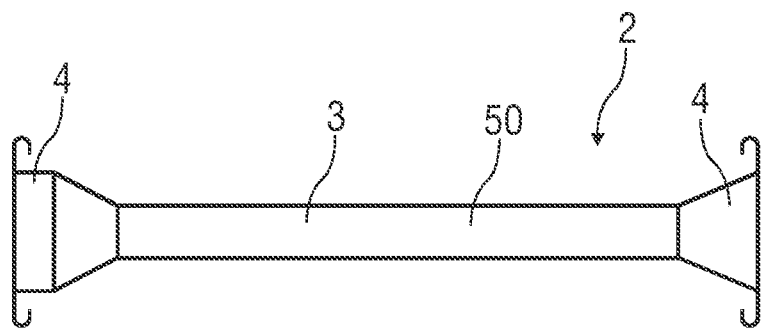

FIG. 4A shows a further possible exemplary embodiment of a measuring tube 2.

An option is an inner coating of the measuring tube 2 with silicone as an elastic lining, which inner coating may be removed; another option is a version with an exchangeable silicone cover piece 50.

In the embodiment shown, a massive embodiment of the two feed sections 4 is also shown, which on the one hand have the deformation body 3 connected by welding and on the other hand have the sealing sections 5 and the support sections 6 for the housing 7 (not shown) integrally formed. In particular, the sections show the transition from a round cross-section to the oval measuring section or deformation body 3.

Figure 4B:
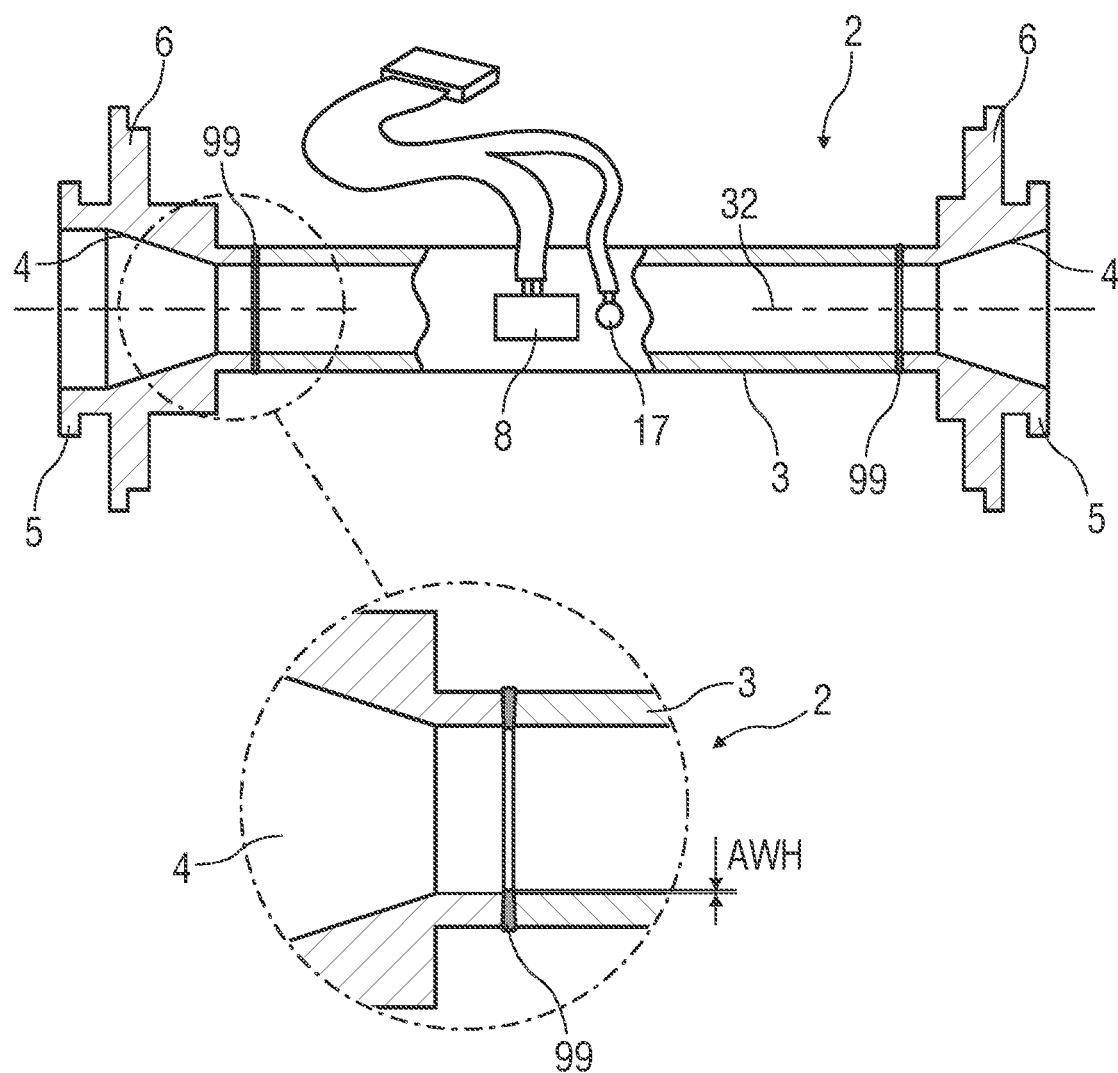

FIG. 4B shows a measuring tube 2 with a preform body 3 and a feed section 4 in a further possible embodiment with respect to the welding. In this case, the weld, as shown, can be realized by welding or also by joining the tubular deformation body 3 into a collar by means of through penetration welding. In this context, it may be provided that a welding quality is achieved without reworking, in which a weld seam 99 has an ejection on an inner surface which reaches a low ejection height AWH of only a few millimeters or less.

Figure 5:
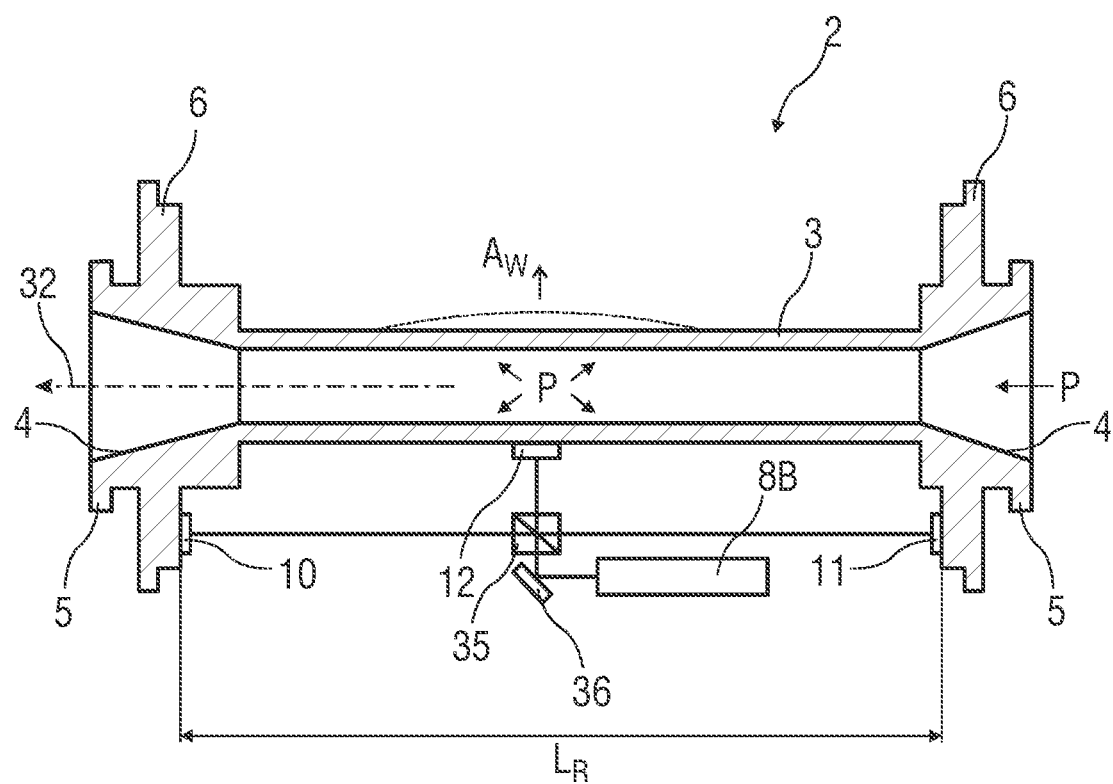

In FIG. 5, a measuring tube 2 is shown in a further embodiment with an interferometrical measurement.

Possible errors due to a transverse offset are eliminated here. On the one hand, a reference length LR is detected by a beam splitter 35, on the other hand, a widening AW is detected by a process pressure P of the deformation body 3 by a transit time offset of light.

The beam splitter 35 may optionally be switched cyclically and the laser optics 8B are optionally designed as a LED laser, laser diode or photodiode.

The laser optics 8B may also be an emitter and a detector at the same time, because the detector, for example also in the form of a CCD sensor or a photo diode, can be coupled via a mirror or beam splitter 35 and thus also be integrated in the structure of the laser optics 8B.

For example, by means of the laser optics 8B, laser radiation is directed onto the mirror 36 and from there onto the beam splitter 35. Starting from this, the laser radiation is sent to the mirror 10 and from there back through the beam splitter 35 to the mirror 11. In one possible embodiment, a detector is arranged on the mirror 11, wherein the signal received with this sensor may be used as a reference measurement with the reference length LR according to the previously described course of the laser radiation. Furthermore, the laser radiation is reflected by the mirror 11 back to the beam splitter 35, which directs it to the mirror 36 and to the laser optics 8B. Thus, a reference measurement with the reference length LR can also be carried out by means of the laser optics 8B.

The laser radiation directed from the laser optics 8B onto the mirror 36 and from this onto the beam splitter 35 is also directed onto the mirror 12 arranged on the deformation body 3, which has different positions depending on the widening AW. Laser radiation is reflected from the mirror 12 back to the beam splitter 35, which deflects it to the mirror 11 and to the mirror 36. By means of the detector (not shown in more detail), which is arranged, for example, in the area of the mirror 11 or 12, a transit time of the laser radiation and, as a result, the widening AW can be determined. The laser optics 8B may also be used to determine a transit time of the laser radiation and, as a result, the widening AW.

The invention is not limited to the preceding detailed exemplary embodiments. It can be modified within the scope of the following claims. Individual aspects from the dependent claims may also be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring system for a physical variable, the measuring system comprising:
    a housing;
    a measuring tube comprising:
        at least one tubular deformation body having a cross-section which is deformed at least partially in a defined manner deviating from a circular cross-section and which is configured to expand elastically under pressure;
        two feed sections which are each attached to end sections of the deformation body and which each have a circular cross-section at outer edge sections thereof;
        two sealing sections for sealingly coupling the measuring system to a process, the sealing sections being integrally formed to the outer edge sections of the feed sections; and
        two molded support sections which carry the housing;
    a measuring sensor system configured to measure values of at least one of a stretching or a widening at at least two points on a section of the deformation body; and
    an evaluation unit configured to electronically evaluate measured values of the at least one of the stretching or widening and to output them as a measurement signal,
    wherein the housing at least partially surrounds and stabilizes the measuring tube on an outside in a direction of extension of the measuring tube, and
    wherein the housing is provided with a vacuum and/or a negative pressure compared to the outside atmosphere.
2. The measuring system according to claim 1, wherein the physical variable is pressure.
3. The measuring system according to claim 1, wherein the housing encloses the measuring tube in a sealing manner.
4. The measuring system according to claim 1, wherein the measuring tube is lined on the inside with one of silicone and an exchangeable silicone cover piece.
5. The measuring system according to claim 1, wherein the deformation body of the measuring tube has a wall thickness of 0.1 mm to 0.5 mm or 0.2 mm to 3.0 mm.
6. The measuring system according to claim 1, wherein the measuring tube comprises connecting pieces having an inside diameter of 3 mm to 40 mm or 20 mm to 60 mm.
7. The measuring system according to claim 1, wherein the feed sections have a wall thickness which corresponds to a wall thickness of the deformation body.
8. The measuring system according to claim 1, wherein the feed sections are solid, and/or the feed sections comprise a transition of the inner contour from circular to oval.
9. The measuring system according to claim 1, wherein the feed sections are configured in one piece with the support sections and the sealing sections.
10. The measuring system according to claim 1, wherein the housing is integrally and sealingly attached to the support sections.
11. The measuring system according to claim 1, wherein the housing has a service port for installing and/or controlling the one of vacuum and negative pressure.
12. The measuring system according to claim 1, wherein the housing has a pressure sensor and/or a vacuum sensor inside for monitoring the one of vacuum and the negative pressure.
13. The measuring system according to claim 1, wherein the measuring tube has an applied temperature sensor which is positioned inside the housing.
14. The measuring system according to claim 1, wherein the housing is provided with a glass bushing toward one of the outside atmosphere and a second part of the housing, and wherein contacts for signal transmission are led through the glass bushing.
15. The measuring system according to claim 1, further comprising an interface that is adapted to be contacted by plug contact and/or a display for outputting measured values.
16. The measuring system according to claim 1, wherein the evaluation unit is configured to evaluate stretchings and/or widenings of the deformation body of the measuring tube based on:
    data recorded by an optical measuring system;
    data captured by laser optics, the laser optics carrying out a reference measurement on the basis of laser radiation guided via mirrors and/or a direct measurement based on laser radiation guided via one of a beam splitter and a common passage via at least three mirrors;
    data recorded by at least one capacitive sensor;
    data captured by at least one strain-sensitive optical fiber sensor which is wound around the measuring tube;
    data recorded by two or four strain gauges;
    data recorded by a Wheatstone bridge, which is formed from strain gauges; and/or
    data recorded by at least one surface acoustic wave sensor.
17. The measuring system according to claim 16, wherein the evaluation unit is configured to evaluate stretchings and/or widenings of the deformation body of the measuring tube with the aid of a Fast Fourier Transformation.
18. The measuring system according to claim 1, further comprising sensors for determining a flow rate and at least one output unit for outputting a signal comprising the flow rate, a pressure and a temperature.
19. The measuring system according to claim 1, wherein the housing has a length of 100 mm to 300 mm or 50 mm to 800 mm.
20. The measuring system according to claim 1, wherein the measuring tube and the feed sections are joined by weld seams, the weld seams being produced by at welding, through welding, orbital welding or laser welding.

21. The measuring system according to claim 20, wherein a roughness of an inner surface of the measuring tube and of the feed sections in the area of the weld seams has an Ra value of less than or equal to 3 μm, less than or equal to 2 μm, or less than or equal to 0.8 μm.

22. The measuring system according to claim 20, wherein a transition between an inner surface of the measuring tube and the feed section runs at least substantially flat, without edges, without steps, and/or without ejections with a maximum height of 2 mm in the area of the weld seams.

23. The measuring system according to claim 1, wherein the deformation body and/or the feed sections have a larger diameter and/or a larger cross section than the sealing sections.

\* \* \* \* \*